Patented Mar. 11, 1952

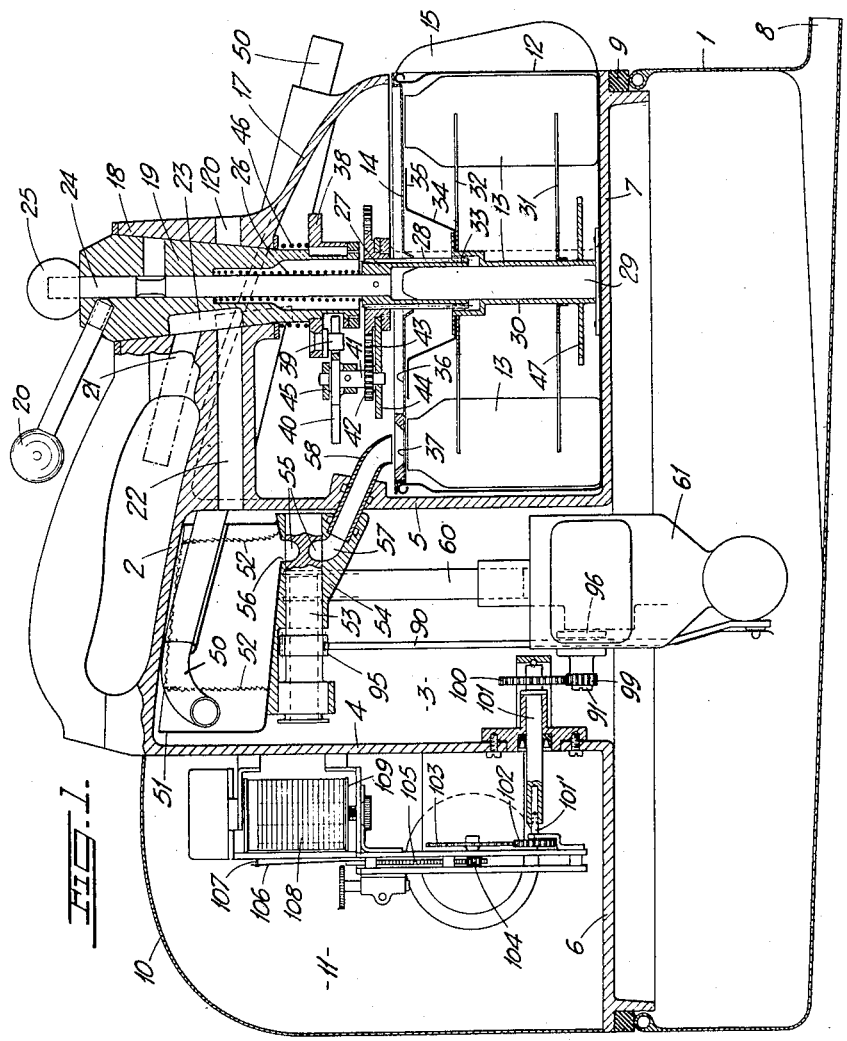

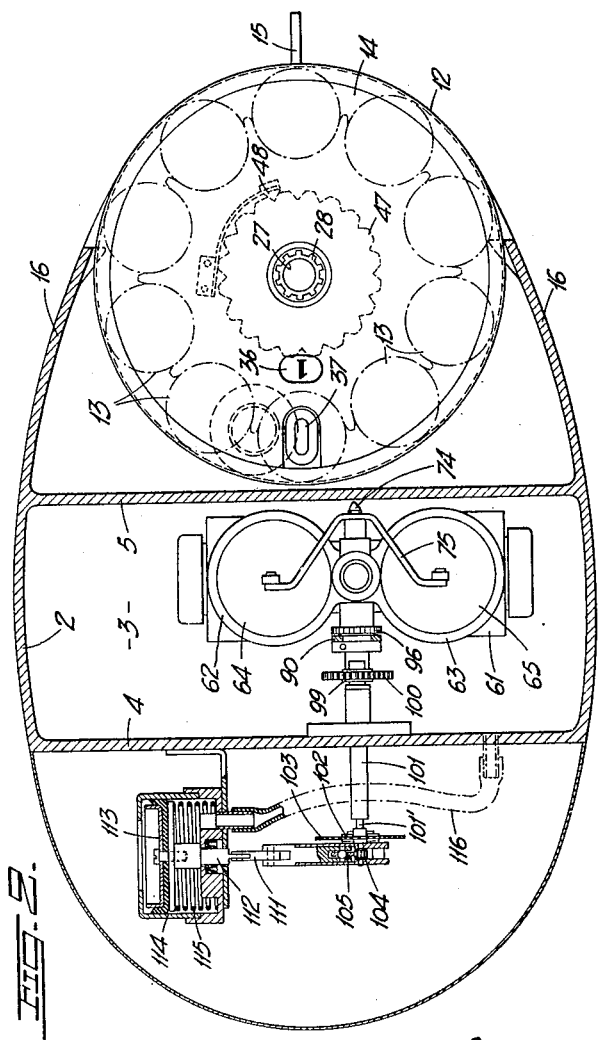

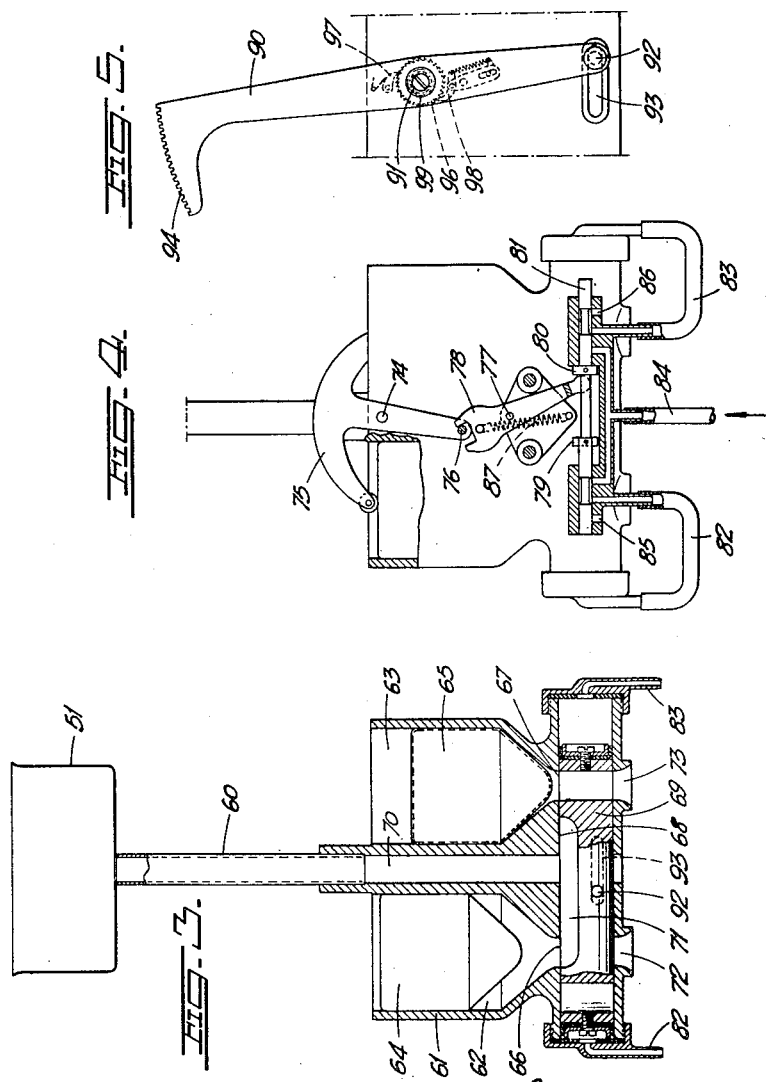

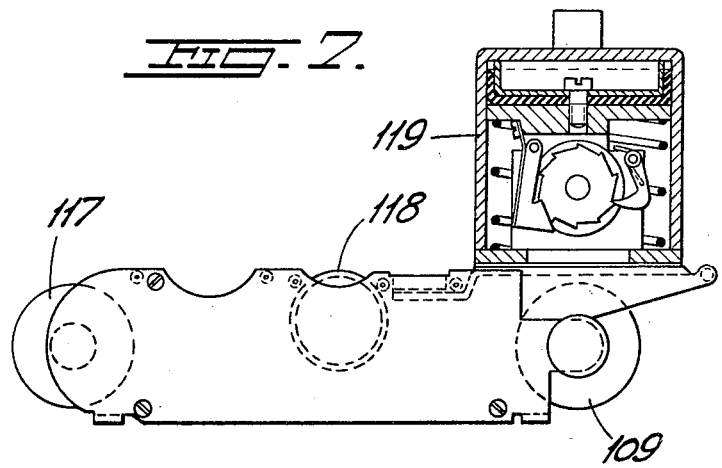
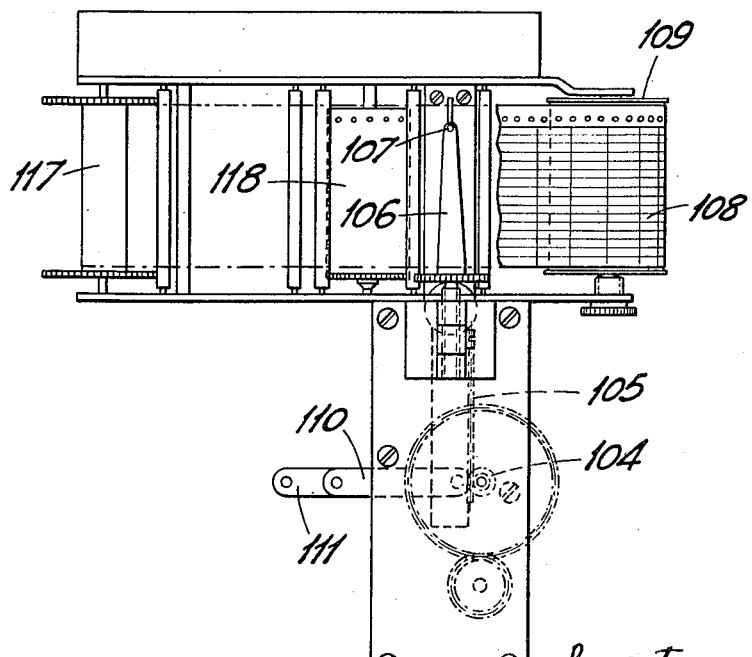

2,588,461

UNITED STATES PATENT OFFICE 2,588,461

TEST MILKING APPARATUS

John William Lennart Atterling and Eric Redin, Norrkoping, and Helge Ryde, Bromma, Sweden, assignors to Aktiebolaget Manus, Norrkoping, Sweden Application December 15, 1950, Serial No. 201,026
In Sweden October 29, 1949

16 Claims. (Cl. 73—421)

The present invention relates to an apparatus for effecting test milking of stocks of animals in such a way as to allow the owner of the animals to take care of the test milking operation while preventing him from changing the quality or quantity of the tests. In the copending patent application Ser. No. 20,143, of April 9, 1948, now U. S. Patent 2,572,518, issued October 23, 1951, a test milking apparatus is described which requires the use of test tubes which seal themselves automatically at the completion of the milking operation. In this prior apparatus the taking of tests is made while the test tube is enclosed within a receptacle subjected to the vacuum of the milking machine which is closed by the insertion of the test tube therein, and in which receptacle the milk delivered by the several animals of the stock is successively received. The automatic sealing of the test tube takes place by annulling the vacuum within the receptacle after the completion of a test milking operation. The receptacle being emptied, the test tube may be removed therefrom and sent to the controlling authority for analyzing and recording purposes.

In the said already proposed apparatus a test tube must be inserted into the receptacle for each animal to be milked, after the receptacle is completely emptied. This renders the operation of the apparatus difficult and, especially in case of larger stocks of animals, the test milking operation will be a very time wasting work.

An object of the present invention is to provide a test milking apparatus which is more easy to handle than the apparatus above referred to, since there is no need of inserting a test tube into a milk receiving receptacle for each animal to be milked. In the apparatus according to the present invention the milk receiving receptacle is provided with an outlet controlled by a portion meter which leads to a circular row of test tubes provided externally of the receptacle which may be moved in succession to a filling position with relation to said outlet, for instance, by rotating the row of test tubes.

The above said and other features of the invention will more nearly appear from the following description, reference being had to the accompanying drawings.

In the drawings, Fig. 1 is a vertical section and Fig. 2 a horizontal section of a test milking apparatus according to the present invention. Fig. 3 is a vertical section of a volume meter belonging to the apparatus and Fig. 4 is a side elevation, partly in section, of this volume meter. Fig. 5 is an elevation of a mechanism controlled by the volume meter for operating a registering device, and Figs. 6 and 7 are a part sectional plan view and a part sectional side elevation, respectively, of the registering device.

The frame of the apparatus comprises a cup-shaped lower member 1 and an upper member 2. The upper member 2 includes two transversely extending vertical walls 4 and 5, forming between themselves a chamber 3 in communication with the interior of the frame member and, at the sides of said walls, two horizontal bottom members 6 and 7 forming covers for the lower frame member. The lower frame member 1 is provided with an outlet 8 leading to a valve controlled discharge conduit, not shown. Inserted between the lower frame member 1 and the upper frame member 2, is a packing element 9. The space formed by the interior of the lower frame member 1 and the chamber 3 in the upper frame member 2 may be closed airtightly by closing said outlet 8. The horizontal portion 6 of the upper frame member forms the bottom of an instrument chamber 11 otherwise bounded by the vertical wall 4 and a cap 10, while the horizontal portion 7 of the upper frame member forms a platform for supporting a preferably cylindrical test tube carrier 12 in the shape of a casing adapted to receive a circular row of test tubes 12 along its cylindrical surface. Said test tube carrier is provided with a cover 14 which may be sealed, as well as with a handle 15 allowing its placing on and removing from the platform 7. To opposite sides of the platform 7 the upper frame portion forms side walls 16, Fig. 2, leaving between them an opening for inserting the test tube carrier onto the platform and removing it therefrom. Provided above the platform 7 and the test tube carrier placed thereon is a cover 17 formed integrally with the upper frame member 2.

Formed integrally with said cover 17 is a housing 18 for a vertically positioned rotatable valve body or plug 19 the axis of which coincides with the axis of the test tube carrier when the latter is inserted on the platform 7. Said plug 19 is provided with a handle 20 for turning same. Leading to the housing 18 from a source of vacuum, not shown, is a channel 21 and leading from the housing 18 to the chamber 3 is a channel 22 extending through an enlargement of the cover 17. The connection between the channels 21 and 22 is controlled by a recess 23 formed in the plug 19.

The plug 19 is also formed with a central boring for receiving and guiding a through extending stem 24 slidably and rotatably mounted in said boring. At its top said stem carries a handle 25. The lowermost portion of the boring for the stem is widened to receive a helical spring 26 surrounding the stem which is clamped between the upper end wall of said widened portion of the boring and a sleeve 27 attached to the bottom end of the stem 24 which is provided with a set of axially extending teeth 28 on its outer surface, see also Fig. 2. The sleeve 27 surrounds rotatably and slidably a pin 29 secured to the bottom of the test tube carrier 12. Rotatably mounted on said pin 29 below the sleeve 27 is a hub 30 carrying a lower and an upper disc 31, 32, said discs having recesses in their periphery to form pockets or seats for receiving the test tubes, as will appear from Fig. 2. At its top the hub 30 is widened and provided on the inside of said widened portion with an annular set of teeth 33 slidably engaged by the axially extending teeth 28 of sleeve 27. Attached to a flange at the top of the widened portion of the hub 30 is a cup-shaped member 34 having a top flange 35 immediately below the cover 14 of the test tube carrier. Said flange 35 carries on its top surface a number for each test tube seat of the carrier. In the example shown the test tube carrier may receive ten tubes and, consequently, the flange 35 carries the numbers 1—10 opposite the individual test tube seats. Formed in the cover 14 of the test tube carrier is an aperture 36 through which the number representing the test tube seat for the time being in filling position may be observed. The filling in position is determined by a filling opening 37 formed in the cover 14 radially outside the aperture 36.

Provided at the lower portion of the plug 19 is a collar 38 carrying an axial pin 39 for operating a Geneva stop 40. The shaft 41 of the Geneva stop supports a pinion 42 meshing into a toothed wheel 43 concentrically surrounding the sleeve 27 which is provided with an internal toothed rim in mesh with the teeth 28 of sleeve 27. The hub of the toothed wheel 43 rests on a disc 44 attached in a manner not shown to the frame portion 17, said disc also constituting a bearing for the bottom end of the shaft 41 of the Geneva stop, the upper bearing of which is provided in a stay 45 secured to the frame member 17. Inserted between the frame member 17 and the collar 38 of the plug 19 is a spring 46 tending to maintain the plug in contact with the inside of the housing 18.

By means of the transmission above described it is possible by turning the plug 19 to effect a step-by-step rotation of the sleeve 27 and via said sleeve also of the hub 30 with the associated discs 31 and 32 in order to move a test tube at the time into filling position. In order to maintain the test tube carrier in position after each step of movement thereof the hub 30 carries a ratchet gear 47 engaged by a spring operated pawl 48, Fig. 2.

Leading to the chamber 3 of the upper frame member 2, in addition to the vacuum channel 22, is a milk supplying tube 50 from a milking machine, not shown. Said tube 50 ends in an aeration and filtering vessel 51 provided in the chamber 3 at the upper end thereof. A filter 52 is provided in the vessel 51 in such a position with relation to the tube 50 as to be passed by all the milk delivered therefrom.

Provided below the vessel 51 is a horizontally arranged rotary valve 53 the casing 54 of which is attached to the walls of the chamber 3 in a way not specially shown. Said casing 54 forms a support for the vessel 51. The rotary valve 53 comprises a cylindrical body having a pair of diametrically opposite pockets 55 located at a portion of the length of the valve situated in register with an outlet 56 of the vessel 51. As soon as one of said pockets is filled with a portion of milk from the vessel 51 through the outlet 56, the valve is turned through half a revolution, thereby first closing the outlet 56 by covering it by an intact portion of the valve body between the pockets and then bringing the other previously downwardly directed pocket into register with the outlet 56, the filled pocket being at the same time brought into communication with a discharge channel 57 provided in the valve casing 54. Connected to this discharge channel is a discharge pipe 58 airtightly extending through the wall 5 which ends above the filling in opening 37 in the cover 14 of the test tube carrier.

The aeration vessel 51 is, independently of the valve 53 and its casing, in permanent communication through a pipe 60 with a volume meter provided in the lower portion of the chamber 3 which also extends down into the interior of the lower frame member 1. Said volume meter comprises a float vessel 61 containing two chambers 62 and 63 at the side of each other, each of said chambers having a float 64 and 65, respectively. The float chambers are preferably formed as vertical cylinders open at their top, in which cylinders the floats fit like pistons. The float chambers taper conically at their bottom ends towards openings 66 and 67 which lead to a boring 68 for a slide 69. The bottom portions of the floats are correspondingly conical with rounded ends. The object of this feature is to secure good conditions of flow when milk passes through the openings 66 and 67 into the float chambers, so that the milk cannot exert any blows on the floats.

The slide 69 may reciprocate in the boring 68 to control the connection between the pipe 60 and the float chambers via a channel 70 formed in the float vessel and a pocket 71 formed in the slide in such a way that only one float chamber at a time may be in communication with pipe 60. In addition, the slide controls connections between the openings 66, 67 on the one side and outlet openings 72 and 73, respectively, on the other side, the arrangement being such that in one end position of the slide one float chamber is in communication with the respective outlet while in the opposite end position of the slide the other float chamber is in communication with its respective outlet. The displacement of the slides 69 between its end positions is controlled by the atmospheric pressure. To this end one end of the slide is exposed to the atmosphere while the other end of the slide is subjected to the vacuum existing in chamber 3 and the lower frame member 1. The admission of atmospheric air and vacuum to the valve is controlled by the floats themselves through the intermedium of a controlling device shown in Fig. 4. Said device is constructed as follows:

Rotatably mounted at the float vessel by means of a horizontal pin 74 is a substantially T-shaped lever the two lateral arms of which are arc-shaped, each of them extending into a separate one of the float chambers. The stem of said lever forms one member of a toggle-joint, inasmuch as it engages by means of a pin 76 at its lower end the fork-shaped top of a lever 78 mounted at 77, the bottom end of which projects into the space between two abutments 79 and 80 on a reciprocable slide 81 for controlling the communication between, on the one hand, two pipes 82, 83 leading to opposite ends of the boring 68 and, on the other hand, in its one extreme position a pipe 84 leading from the atmosphere and in its other extreme position two channels 85, 86 leading to the interior of the lower frame member 1. The shifting of said control slide 81 between said positions is effected by the lever 78 which on a shifting of the toggle-joint 75, 76 moves one or the other abutment 79 or 80 with it, depending on the direction of shift of the toggle-joint. In order to allow a rapid shifting operation the lever arm 78 is loaded by a spring 87.

The float controlling slide 69 delivers power both for effecting a step-by-step rotation of the portion valve 53 and for controlling a registering mechanism provided in the chamber 11. The primary means of the respective transmission comprises a two-armed lever 90 mounted on the float vessel at 91 which extends upwardly through the chamber 3 from the bottom end of the float vessel to the valve 53. The lower end of said lever 90 is pivotally connected at 92 to the slide 69 so as to take part of the motion thereof. The respective pivot pin 92 extends through a slot 93 formed in the wall of boring 68 and of such a shape to allow the swinging movement of the lever 90. The upper end of lever 90 is shaped as a toothed segment 94, Fig. 5, for meshing in a toothed rim 95 provided on valve 53.

The pivot pin 91 of lever 90 carries a ratchet wheel 96. Engaging said ratchet wheel is a pair of pawls 97, 98 pivoted to the lever 90. Mounted on the hub of the ratchet wheel 96 extending through the lever 90 is a pinion 99 in mesh with a toothed wheel 100 on a shaft 101 extending airtightly through the wall 4 into the chamber 11. A shaft 101' coupled to shaft 101 supports a toothed wheel 102 engaging a larger toothed wheel 103 on a shaft carrying a pinion 104 in mesh with a vertically reciprocable rack 105. Said rack carries at its top a spring 106 having a writing instrument 107 for writing on a diagram paper 108 wound on a drum 109 rotatable around a vertical axis. Said drum is controlled by a spring mechanism, not shown.

The rack 105 may be disengaged from the pinion 104 and is normally in disengaged state. To this end the rack is mounted on a slide 110 reciprocable with relation to the pinion 104. Said slide is connected by means of a link 111 to the rod 112 of a piston 113 airtightly fitted in a cylinder 114 open at one end, said piston being subjected on its opposite sides to the pressure prevailing in a closed chamber within the cylinder and to the pressure of a spring 115 disposed in said chamber, respectively. Said chamber is in communication with the chamber 3 through a conduit 116.

Fig. 6 which shows the registering mechanism in chamber 11 looking from the left in Fig. 1, discloses at 117 a reel for receiving the paper strip 108. In Fig. 7 is shown a side elevation of the frame supporting the drum 109 and the reel 117 as well as a guide roller 118 provided therebetween; in addition, said figure shows a vertical section of a casing 119 containing a stamping device for marking on the strip 108 a current number for each entire cycle of operation of the plug 19.

The operation of the apparatus will substantially appear from the description of its construction hereinbefore given, so that hereinafter only a brief recapitulation of the operation will be given.

When the apparatus is out of operation, atmospheric pressure prevails in the chamber 3 and the lower frame member 1, since the plug 19 is in a position in which the channel 22 is in communication with an outlet 120 leading to the atmosphere. As a result, atmospheric pressure also exists within the cylinder 114, so that the spring 115 may maintain the piston 113 in its extreme upper position in which the rack 105 is out of mesh with the pinion 104. The rack with the writing instrument is now moved to its lowermost position. The test tubes to be used are placed at a controlling central in a carrier 12, or in several carriers, if required; care should be taken that no tube is positioned below the filling in opening 37. Then the cover 14 of the carrier is put on and sealed. Prior to the placing of the carrier onto the platform 7 the spindle 24 is raised by means of the handle 25 until the sleeve 27 reaches the widened portion of the boring of the plug 19 so as not to prevent the insertion of the casing. The casing being inserted, the spindle 24 is allowed to drop. Then, the plug 19 is rotated counter-clockwise a given angle, say 45°, thereby interrupting the connection between the channel 22 and the atmosphere and bringing channel 22 into communication with the vacuum conduit 21. After a sufficient degree of vacuum is obtained in the chamber 3 and the lower frame member 1, the plug 19 is turned another angle, say another 45°. This will rotate the hub 30 with the discs 31, 32 so as to bring a test tube 13 into position below the filling in opening 37. Now, the milking operation may commence. The milk flows through pipe 50 into the vessel 51 where it will be aerated and filtered to be then passed through pipe 60 down into the volume meter 61, while a portion thereof fills the pocket 55 of valve 53 in register with the discharge opening 56. Via the recess 71 of slide 69 the milk enters the float chamber of the volume meter communicating with pipe 60, say chamber 62, and raises the float, as 64, therein, causing it to shift the toggle-joint 75—78 which in its turn reverses the control slide 81 and effects shifting of slide 69 with the result that the other float chamber, that is to say, in the example suggested the chamber 63 into communication with the pipe 60, while the float chamber 62 is brought into communication with the outlet 72, allowing the milk to pass into the lower frame member 1. The milk entering the said other float chamber 63 lifts the float therein which when reaching its extreme upper position shifts the toggle-joint back to its previous position causing it to again shift the control slide 81 and the shifting slide 69. Each time a shift is thus effected, the lever 90 is operated causing its toothed segment 94 to rotate the valve 53, so that another quantity of milk directly proportional to the total quantity passes from one of the pockets 55 into discharge pipe 58. From the discharge pipe 58 said proportional quantity of milk flows through opening 37 down into the test tube positioned therebelow.

From the ratchet wheel 96 which is rotated step-by-step by means of the lever 90, the movement is transmitted by the transmission described to the pinion 104 imparting thereto a corresponding stepwise rotation. According as the chamber 3 is evacuated also the cylinder 114 is evacuated, allowing the atmospheric pressure acting on the exposed top surface of the piston 113 to displace the piston inwardly while compressing the spring 115. By this means the rack 105 is caused to engage the pinion 104. Thus, the pinion 104 will be in mesh with the rack while rotating, thereby displacing the rack and the writing instrument 106—107 upwardly. On the paper strip 108 unwound from the drum 109 by spring action the writing instrument plots a curve the form of which is a function on the one side of the quantity of milk delivered by the animal under milking and on the other side of the time the milking operation lasts. The diagram also gives a satisfactory record of the value of each individual animal as a milking producer.

In the example shown the test tubes need not seal themselves automatically, since a sealing of the test tube carrier is made before the carrier with a row of empty test tubes therein is handed over to the tester and after that it is not possible to pour milk in any test tube, because none of them is situated in register with the filling in opening 37. After the milking of a stock of animals is completed and the test tube carrier is to be removed, the plug 19 must first be turned to such a position as to restore the communication between the vacuum chamber of the apparatus and the atmosphere via channel 120. On turning the plug 19 to this position, the hub 30 with the discs 31, 32 carried thereby is moved to a position in which no test tube is situated below the filling in opening 37. It is thus seen that neither previous to nor subsequent to the milking operation any pouring of milk into the test tubes may take place without first breaking the seal of the cover 14 of the test tube carrier and during the performance of the milking operation the filling in opening 37 is not available from outside.

We claim:

1. In an apparatus for performing test milking of stocks of animals, an airtightly closeable receptacle, a conduit for connecting the interior of said receptacle to the vacuum of a milking machine and supplying milk thereto from said machine, means in said receptacle for measuring off portions of the milk supplied through said conduit which bear a predetermined relation to the total quantity of milk supplied, a volume meter for measuring the remainder of the quantity of milk supplied and delivering it to the receptacle, means under the control of said volume meter for operating the said measuring off device in order to secure the relationship between the portions measured off and the total quantity of milk supplied, and a discharge conduit leading from said measuring off means to a delivery point outside the receptacle for passing the portions measured off to test tubes positioned outside the receptacle.

2. In an apparatus for performing test milking of stocks of animals, an airtightly closeable receptacle, a conduit for connecting the interior of said receptacle to the vacuum of a milking machine and supplying milk thereto from said machine, a valve mechanism in said receptacle for measuring off portions of the milk supplied through said conduit which bear a predetermined relation to the total quantity of milk supplied, a discharge conduit for passing said measured off quantities to a delivery point outside the receptacle, a volume meter for measuring the remainder of the quantity of milk supplied through said conduit and delivering it to the receptacle, means under the control of said volume meter for controlling the said measuring off valve so as to secure the relationship between the portions measured off and the total quantity of milk supplied, and means provided outside the receptacle to receive a set of test tubes and for passing them in successive order below said delivery point to receive milk from said discharge conduit.

3. In an apparatus for performing test milking of stocks of animals, an airtightly closeable receptacle, a conduit for connecting the interior of said receptacle to the vacuum of a milking machine and supplying milk thereto from said machine, an aeration vessel provided in said receptacle to first receive the milk supplied through said conduit, an outlet from said vessel and a valve for allowing portions of milk which bear a predetermined relation to the total quantity supplied through said conduit to pass therethrough, a discharge conduit leading from said valve controlled outlet to a delivery point outside the receptacle for passing the portions measured off by said valve to test tubes positioned outside the receptacle, a volume meter in said receptacle, a permanently open conduit for passing the remainder of the liquid supplied to the aeration vessel to said volume meter to be measured therein and delivered to the receptacle, and means under the control of said volume meter for operating the said valve in unison with the operation of the volume meter.

4. In an apparatus for performing test milking of stocks of animals, an airtightly closeable receptacle, a conduit for connecting the interior of said receptacle to the vacuum of a milking machine and supplying milk thereto from said machine, a valve in said receptacle for measuring off portions of the milk supplied through said conduit which bear a predetermined relation to the total quantity of milk supplied, a volume meter in said receptacle for measuring the remainder of the quantity of milk supplied through said conduit and delivering it to the receptacle, means under the control of said volume meter for controlling the said measuring off valve so as to secure the relationship between the portions measured off and the total quantity of milk supplied, a discharge conduit leading from said measuring off valve to a delivery point in a space externally of the receptacle which is in communication with the atmosphere, a platform for supporting a test tube carrier in said space, and a control device in said space for successively moving the test tubes of the carrier to said delivery point in order to successively deliver milk to the test tubes from said discharge conduit.

5. In an apparatus for performing test milking of stocks of animals, an airtightly closeable receptacle, a conduit for connecting the interior of said receptacle to the vacuum of a milking machine and supplying milk thereto from said machine, a valve in said receptacle for measuring off portions of the milk supplied through said conduit which bear a predetermined relation to the total quantity of milk supplied, a volume meter for measuring the remainder of the quantity of milk supplied and delivering it to the receptacle, means under the control of said volume meter for operating said valve in order to secure the relationship between the portions measured off and the total quantity of milk supplied, a discharge conduit leading from said measuring off valve to a delivery point in a space externally of the receptacle which is open at the atmosphere, a platform provided in said space below the level of said delivery point, a test tube carrier being placeable onto said platform, said carrier having movable means for feeding a set of test tubes contained therein, to a position in register with said delivery point, a rotatable valve body provided in said space above the level of the carrier for controlling the connection between the interior of the receptacle on the one hand and alternately a vacuum source and the atmospheric air on the other hand, and a transmission including a disengaging clutch provided between said rotatable valve body and said means inside the test tube carrier for effecting a successive movement of said feeding means by rotation of the valve body.

6. In an apparatus for performing test milking of stocks of animals, an airtightly closeable receptacle, a conduit for connecting the interior of said receptacle to the vacuum of a milking machine and supplying milk thereto from said machine, a valve in said receptacle for measuring off portions of the milk supplied through said conduit which bear a predetermined relation to the total quantity of milk supplied, a volume meter for measuring the remainder of the quantity of milk supplied and delivering it to the receptacle, means under the control of said volume meter for operating said valve in order to secure the relationship between the portions measured off and the total quantity of milk supplied, a discharge conduit leading from said measuring off valve to a delivery point in a space externally of the receptacle which is open to the atmosphere, a platform provided in said space below the level of said delivery point, a test tube carrier in the shape of a cylindrical casing being placeable onto said platform, said casing having a set of discs rotatably mounted therein with seats for receiving and guiding the test tubes, the casing having a filling in opening in its top surface, a rotatable valve body provided above the level of the platform and the test tube carrier thereon for controlling the connection between the interior of the receptacle on the one hand and a vacuum source and the atmosphere alternately on the other hand, said valve body being rotatable about a vertical axis in alinement with the axis of rotation of the discs inside the test tube carrier, and means including a Geneva stop and a disengaging clutch between said valve body and said discs to impart a step-by-step rotation thereto by a rotation of the valve body.

7. In an apparatus for performing test milking of stocks of animals, an airtightly closeable receptacle, a conduit for connecting the interior of said receptacle to the vacuum of a milking machine and supplying milk thereto from said machine, a valve in said receptacle for measuring off portions of the milk supplied through said conduit which bear a predetermined relation to the total quantity of milk supplied, a volume meter for measuring the remainder of the quantity of milk supplied and delivering it to the receptacle, means under the control of said volume meter for operating said valve in order to secure the relationship between the portions measured off and the total quantity of milk supplied, a discharge conduit leading from said measuring off valve to a delivery point in a space externally of the receptacle which is open to the atmosphere, a platform provided in said space below the level of said delivery point, a test tube carrier in the shape of a cylindrical casing being placeable onto said platform, said carrier comprising a casing having a sealable cover with a filling in opening adapted to be located below the said delivery point, and means provided in said space at a level above the platform and the carrier placed therein for controlling a successively feeding of the test tubes of the test tube carrier into position below said filling in opening, the arrangement being otherwise such that in the normal position of the test tube carrier, that is to say, before its placing onto or removal from the platform, no test tube is situated below the filling in opening.

8. In an apparatus for performing test milking of stocks of animals, an airtightly closeable receptacle, a conduit for connecting the interior of said receptacle to the vacuum of a milking machine and supplying milk thereto from said machine, a valve in said receptacle for measuring off portions of the milk supplied through said conduit which bear a predetermined relation to the total quantity of milk supplied, a volume meter for measuring the remainder of the quantity of milk supplied and delivering it to the receptacle, means under the control of said volume meter for operating said valve in order to secure the relationship between the portions measured off and the total quantity of milk supplied, a discharge conduit leading from said measuring off valve to a delivery point in a space externally of the receptacle which is open to the atmosphere, a platform provided in said space below the level of said delivery point, a test tube carrier placeable onto said platform, said carrier comprising a cylindrical casing having a sealable cover with a filling in opening, a set of rotatable discs inside said casing, said discs having seats for receiving a circular row of test tubes, a dial rigidly connected to said discs which carries a set of numbers on its upper surface corresponding to the individual test tube seats, the cover of the casing having an aperture for rendering a number of the discs at a time visible as the respective test tube is in position below the filling in opening, and means provided in said space above the platform and the test tube carrier thereon for controlling the adjusting of the test tubes into position below the filling in opening.

9. In an apparatus for performing test milking of stocks of animals, an airtightly closeable receptacle, a conduit for connecting the interior of said receptacle to the vacuum of a milking machine and supplying milk thereto from said machine, means in said receptacle for measuring off portions of the milk supplied through said conduit which bear a predetermined relation to the total quantity of milk supplied, a volume meter for measuring the remainder of the quantity of milk supplied and delivering it to the receptacle, said volume meter having two milk receiving chambers, each chamber having a movable wall, a shifting mechanism under the control of said movable walls for alternately bringing one and the other chamber into position for receiving and discharging a predetermined quantity of milk, means under the control of said shifting mechanism for operating the said measuring off valve in order to secure the relationship desired between the portions measured off and the total quantity of milk supplied, and a discharge conduit leading from said measuring off means to a delivery point outside the receptacle for passing the portions measured off to test tubes positioned outside the receptacle.

10. In an apparatus for performing test milking of stocks of animals, an airtightly closeable receptacle, a conduit for connecting the interior of said receptacle to the vacuum of a milking machine and supplying milk thereto from said machine, a valve mechanism in said receptacle for measuring off portions of the milk supplied through said conduit which bear a predetermined relation to the total quantity of milk supplied, a discharge conduit for passing said measured off quantities to a delivery point outside the receptacle, a volume meter for measuring the remainder of the quantity of milk supplied through said conduit and delivering it to the receptacle, said volume meter having two chambers, a float in each chamber reciprocable like a piston therein, each chamber having an outlet opening in its bottom, a reciprocable shift valve under the control of said floats for alternately shifting said opening into and out of communication with a milk supplying conduit and the interior of the receptacle, means under the control of said shifting valve for controlling the said measuring off valve so as to secure the relationship between the portions measured off and the total quantity of milk supplied, and means provided outside the receptacle for carrying a set of test tubes and passing them in successive order below said delivery point to receive milk from said discharge conduit.

11. In an apparatus for performing tests milking of stocks of animals, an airtightly closeable receptacle, a conduit for connecting the interior of said receptacle to the vacuum of a milking machine and supplying milk thereto from said machine, a valve mechanism in said receptacle for measuring off portions of the milk supplied through said conduit which bear a predetermined relation to the total quantity of milk supplied, a discharge conduit for passing said measured off quantities to a delivery point outside the receptacle, a volume meter for measuring the remainder of the quantity of milk supplied through said conduit and delivering it to the receptacle, said volume meter having two chambers, a float in each chamber reciprocable like a piston therein, each chamber having an outlet opening in its bottom, a reciprocable shift valve under the control of said floats for alternately shifting said openings into and out of communication with a milk supplying conduit and the interior of the receptacle, the lower ends of said floats and the bottoms of the respective chambers of the volume meter being conically tapering downwardly for facilitating the filling and the emptying of the chambers, means under the control of said shifting valve for controlling the said measuring off valve so as to secure the relationship between the portions measured off and the total quantity of milk supplied, and means provided outside the receptacle for carrying a set of test tubes and passing them in successive order below said delivery point to receive milk from said discharge conduit.

12. In an apparatus for performing test milking of stocks of animals, an airtightly closeable receptacle, a conduit for connecting the interior of said receptacle to the vacuum of a milking machine and supplying milk thereto from said machine, a valve mechanism in said receptacle for measuring off portions of the milk supplied through said conduit which bear a predetermined relation to the total quantity of milk supplied, a discharge conduit for passing said measured off quantities to a delivery point outside the receptacle, a volume meter for measuring the remainder of the quantity of milk supplied through said conduit and delivering it to the receptacle, said volume meter having two chambers, a float in each chamber reciprocable like a piston therein, each chamber having an outlet opening in its bottom, a reciprocable shift valve under the control of said floats for alternately shifting said openings into and out of communication with a milk supplying conduit and the interior of the receptacle, said reciprocable valve being adapted to be operated by the difference in pressure between the atmospheric pressure and the vacuum existing in the milk receiving receptacle, and a slide valve for controlling the admission of said difference in pressure alternately to one end or the shift valve, means under the control of said floats for operating said control slide valve, means under the control of said shifting valve for controlling the said measuring off valve so as to secure the relationship between the portions measured off and the total quantity of milk supplied, and means provided outside the receptacle for carrying a set of test tubes and passing them in successive order below said delivery point to receive milk from said discharge conduit.

13. In an apparatus for performing test milking of stocks of animals, an airtightly closeable receptacle, a conduit for connecting the interior of said receptacle to the vacuum of a milking machine and supplying milk thereto from said machine, an aeration vessel in said receptacle for first receiving the milk from said conduit, an outlet from said vessel, a step-by-step rotatable valve for controlling said outlet, a discharge conduit leading from said valve to a delivery point outside said receptacle, said valve being formed with pockets to receive a portion of milk at a time from the aeration vessel and deliver it to said discharge conduit, a volume meter provided in the receptacle for measuring the remainder of the quantity of milk supplied to the aeration vessel and delivering it to the receptacle, a permanently open communication between said aeration vessel and said volume meter and means under the control of said volume meter for operating the said measuring off valve in order to secure a predetermined relationship between the portions measured off by said valve and the quantity of milk passing through the volume meter.

14. In an apparatus for performing test milking of stocks of animals, an airtightly closeable receptacle, a conduit for connecting the interior of said receptacle to the vacuum of a milking machine and supplying milk thereto from said machine, a valve mechanism in said receptacle for measuring off portions of the milk supplied through said conduit which bear a predetermined relation to the total quantity of milk supplied, a discharge conduit for passing said measured off quantities to a delivery point outside the receptacle, a volume meter for measuring the remainder of the quantity of milk supplied through said conduit and delivering it to the receptacle, means under the control of said volume meter for controlling the said measuring off valve so as to secure the relationship between the portions measured off and the total quantity of milk supplied, means provided outside the receptacle for carrying a set of test tubes and passing them in successive order below said delivery point to receive milk from said discharge conduit, means outside said receptacle for recording the quantities of milk passing through the volume meter, and a transmission including a shaft extending airtightly through a wall of said receptacle to impart motion from the volume meter to said recording device for controlling same in conformity with the operation of the volume meter.

15. In an apparatus for performing test milking of stocks of animals, an airtightly closeable receptacle, a conduit for connecting the interior of said receptacle to the vacuum of a milking machine and supplying milk thereto from said machine, a valve mechanism in said receptacle for measuring off portions of the milk supplied through said conduit which bear a predetermined relation to the total quantity of milk supplied, a discharge conduit for passing said measured off quantities to a delivery point outside the receptacle, a volume meter for measuring the remainder of the quantity of milk, supplied through said conduit and delivering it to the receptacle said volume meter being operable by the action of the milk supplied thereto, means under the control of said volume meter for controlling the said measuring off valve so as to secure the relationship desired between the portions measured off and the quantity of milk passing through the volume meter, means outside said receptacle for recording the quantities of milk passing through the volume meter, and a transmission including a shaft extending airtightly through a wall of said receptacle to impart motion from the volume meter to said recording device for controlling same in conformity with the operation of the volume meter.

16. In an apparatus for performing test milking of stocks of animals, an airtightly closeable receptacle, a conduit for connecting the interior of said receptacle to the vacuum of a milking machine and supplying milk thereto from said machine, a valve mechanism in said receptacle for measuring off portions of the milk supplied through said conduit which bear a predetermined relation to the total quantity of milk supplied, a discharge conduit for passing said measured off quantities to a delivery point outside the receptacle, a volume meter for measuring the remainder of the quantity of milk supplied through said conduit and delivering it to the receptacle, said volume meter being operable by the action of the milk delivered thereto, means under the control of said volume meter for controlling the said measuring off valve so as to secure the relationship desired between the portions measured off and the quantity of milk passing through the volume meter, means provided outside the receptacle for carrying a set of test tubes and passing them in successive order below said delivery point to receive milk from said discharge conduit, means outside said receptacle for recording the quantities of milk passing through the volume meter, a transmission including a shaft extending airtightly through a wall of said receptacle to impart motion from the volume meter to said recording device for controlling same in conformity with the operation of the volume meter, and means combined with said recording device for printing number on the paper strip to indicate each complete milking operation.

JOHN WILLIAM LENNART ATTERLING.
ERIC REDIN.
HELGE RYDE.

REFERENCES CITED

The following references are of record in the file of this patent:

UNITED STATES PATENTS

| Number | Name | Date |
| --- | --- | --- |
| 1,561,939 | Lowe | Nov. 17, 1925 |
| 2,418,876 | Grace, Jr. | Apr. 15, 1947 |
| 2,540,741 | Krueger | Feb. 6, 1951 |
| 2,572,518 | Redin et al. | Oct. 23, 1951 |

FOREIGN PATENTS

| Number | Country | Date |
| --- | --- | --- |
| 480,182 | Great Britain | Feb. 18, 1938 |